United States Patent
Zhong et al.

(10) Patent No.: US 8,005,328 B2
(45) Date of Patent: Aug. 23, 2011

(54) OPTICAL ADD/DROP MODULE

(75) Inventors: Johnny Zhong, Union City, CA (US); Steve Wang, San Jose, CA (US); Yin Zhang, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 1606 days.

(21) Appl. No.: 10/724,426

(22) Filed: Nov. 26, 2003

(65) Prior Publication Data

US 2004/0109635 A1 Jun. 10, 2004

Related U.S. Application Data

(60) Provisional application No. 60/429,253, filed on Nov. 26, 2002.

(51) Int. Cl.
*G02B 6/28* (2006.01)
(52) U.S. Cl. ........................................ 385/24
(58) Field of Classification Search ............... 385/24, 385/17, 47; 359/124, 127, 128
See application file for complete search history.

(56) References Cited

U.S. PATENT DOCUMENTS

| | | | |
|---|---|---|---|
| 5,652,814 A | 7/1997 | Pan et al. | |
| 5,754,718 A | 5/1998 | Duck et al. | |
| 5,812,306 A | 9/1998 | Mizrahi | |
| 6,256,433 B1* | 7/2001 | Luo et al. | 385/24 |
| 6,275,322 B1* | 8/2001 | Tai | 359/279 |
| 6,278,818 B1* | 8/2001 | Laming et al. | 385/37 |
| 6,388,783 B1 | 5/2002 | Weller-Brophy | |
| 6,512,615 B2* | 1/2003 | Wu et al. | 398/87 |
| 6,871,022 B2* | 3/2005 | Xu | 398/53 |
| 2002/0118417 A1* | 8/2002 | Barry et al. | 359/127 |
| 2003/0053747 A1* | 3/2003 | Cormack | 385/24 |
| 2003/0123827 A1* | 7/2003 | Salerno et al. | 385/129 |
| 2003/0128917 A1* | 7/2003 | Turpin et al. | 385/24 |

OTHER PUBLICATIONS

U.S. Appl. No. 10/724,471, filed Nov. 26, 2003, Zhong, et al.
U.S. Appl. No. 10/724,428, filed Nov. 26, 2003, Zhong, et al.

* cited by examiner

*Primary Examiner* — Ryan Lepisto
*Assistant Examiner* — Eric Wong
(74) *Attorney, Agent, or Firm* — Maschoff Gilmore & Israelsen

(57) ABSTRACT

A WDM add/drop module. The drop portion of the add/drop module is accomplished by using thin film filters or thin film interleavers. The add portion of the add/drop module uses fused fiber interleavers for the less critical stages of the multiplexing process. In a final stage, fused fiber interleavers can be placed in series. A thin film intervleaver having a flattop frequency response may also be used for the critical stage where the multiplexed channels are more closely spaced. The frequency response of the thin film interleaver is relatively constant across a bandwith of a channel while having a drop off at the channel edge to reduce cross talk.

17 Claims, 7 Drawing Sheets

OPTICAL ADD/DROP MODULE

CROSS-REFERENCE TO RELATED APPLICATIONS

This application claims the benefit of U.S. Provisional Application No. 60/429,253, titled AN OPTICAL ADD/DROP MODULE, filed Nov. 26, 2002, which is hereby incorporated by reference.

BACKGROUND OF THE INVENTION

1. The Field of the Invention

The invention generally relates to the field of multiplexed fiber-optic communication. More specifically, the invention relates to methods and apparatus for extracting and replacing channels on a wavelength division multiplexed optical signal using an optical add/drop module.

2. The Relevant Technology

Fiber-optics are increasingly used for transmitting voice and data signals. As a transmission medium, light provides a number of advantages over traditional electrical communication techniques. For example, light signals allow for extremely high transmission rates and very high bandwidth capabilities. Also, light signals are resistant to electromagnetic interference that would otherwise interfere with electrical signals. Light also provides a more secure signal because it does not emanate the type of high frequency components often experienced with conductor-based electrical signals. Many conventional electrical networks are being upgraded to optical networks to take advantage of the increased speed and efficiency.

One goal in optical fiber networks is to increase the amount of data traffic that can be transmitted through a single optical fiber. One way of increasing the amount of data traffic transmitted through an optical fiber is by using various types of multiplexing arrangements. One such multiplexing arrangement, referred to as Wavelength Division Multiplexing (WDM), is based on sending multiple signals down the same optical fiber where each signal is a modulated carrier beam. Each of the carrier beams has a different frequency or wavelength than the other carrier beams on a particular fiber. In Coarse Wavelength Division Multiplexing (CWDM), signals are sent using lasers with wavelengths varying between 1470 nm and 1610 nm in 20 nm increments. Each wavelength represents a different data channel. Another example of WDM is Dense Wavelength Division Multiplexing (DWDM). In DWDM, channels are sent using lasers with wavelengths that are much closer together than in CWDM.

To effectively use the channels in a multiplexed signal, the channels need to be extracted from the multiplexed signal. This can be accomplished using a number of devices including optical add/drop modules and interleavers. Optical add/drop modules extract a single channel from the multiplexed signal and allow the single channel to be routed to a device having need of the channel. Optical add/drop modules also allow for a channel to be input to the optical add/drop module (typically the channel that was dropped), and combine the channel input into the optical add/drop module with the multiplexed signal.

Another component that can be used to extract channels from a multiplexed signal is an interleaver. Interleavers generally divide channels in a multiplexed signal into two different groups of channels. Thus, for a multiplexed signal with several channels, a number of interleavers may be necessary to extract a single channel. For example, a first stage interleaver divides a multiplexed signal of eight channels into two four-channel, multiplexed signals. A second stage interleaver divides the four channel, multiplexed signal into two two-channel, multiplexed signals. A third stage interleaver divides a two-channel, multiplexed signal into two single-channel signals.

Each channel is designed with a certain bandwidth to allow the carrier channel some tolerance in its actual frequency. One problem that arises in such multiplexing arrangements is that when a carrier channel becomes to near an adjacent channels bandwidth, the channel may cross into the adjacent channel and be interpreted as a signal in the adjacent channel. This is commonly referred to as cross talk.

Fused fiber interleavers have a Gaussian response. If the response of fused fiber interleavers is widened, then cross talk become more problematic. If the response of fused fiber interleavers is narrowed, then the fused fiber cannot handle variations in the wavelengths of the channels in a multiplexed optical signal.

BRIEF SUMMARY OF THE INVENTION

Embodiments of the invention relate to optical add/drop modules using fused fiber interleavers and/or thin film interleavers. The optical add/drop module includes a drop portion that extracts optical channels from a multiplexed optical signal. The optical add/drop module includes an add portion. The add portion includes a number of interleaver stages in a cascade arrangement. Each stage has at least one fused fiber interleaver. A stage that interleaves the most densely packed channels includes two fused fiber interleavers. This arrangement, due to the combined effect of the two fused fiber interleavers, results in rapid drop off of a signal that drifts toward an adjacent channel.

Another embodiment of an optical add/drop module includes a drop portion that includes a number of thin film filters. Each thin film filter drops a particular channel from a multiplexed signal. The optical add/drop module also includes an add portion. The add portion adds dropped channels back into the multiplexed signal. The add portion includes a first stage of fused fiber interleavers. The add portion also includes a final stage that includes a thin film interleaver. This allows for the fabrication of an optical add/drop module that maintain essentially constant frequency response over a bandwidth range, while also exhibiting channel separation between adjacent channels.

Yet another embodiment of an optical add/drop module includes a drop portion that extracts at least one channel from a multiplexed signal. The optical add/drop module also includes an add portion that includes a number of stages in a cascade arrangement. Each stage includes at least one fused fiber interleaver. A stage that interleaves the most densely packed channels includes a ceramic sleeve whose thermal coefficient is opposite the fused fiber. Other fused fiber couplers with less sensitive temperature characteristics may also be used in the stage that interleaves the most densely packed channels. This arrangement helps to counteract the thermal effects that may cause a carrier signal to drift into the bandwidth of an adjacent carrier signal.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE INVENTION

Embodiments of the present invention relate to optical add/drop modules using fised fiber interleavers and/or thin film interleavers. One advantage is to reduce cross-talk in optical add/drop modules used in multiplexing arrangements. This is achieved by using a pair of fused fiber intervleavers in series at a stage where the optical channels are most dense. Another embodiment used a thin film filter interleaver at the stage where optical channels are most dense.

Thin film interleavers are designed to have a flat-top frequency response, meaning that the frequency response is essentially constant, over the bandwidth of the channel. The thin film interleaver exhibits sharp losses near the channel edge to maintain channel separation. Other stages use fused fiber interleavers to reduce cost. Yet another embodiment uses a ceramic sleeve around a fused fiber interleaver. The ceramic sleeve counteracts thermal expansion and contraction of the fused fiber. In this way, thermal effects that may cause a defined carrier frequency to shift towards another frequency bandwidth are counteracted.

Figure 1A:
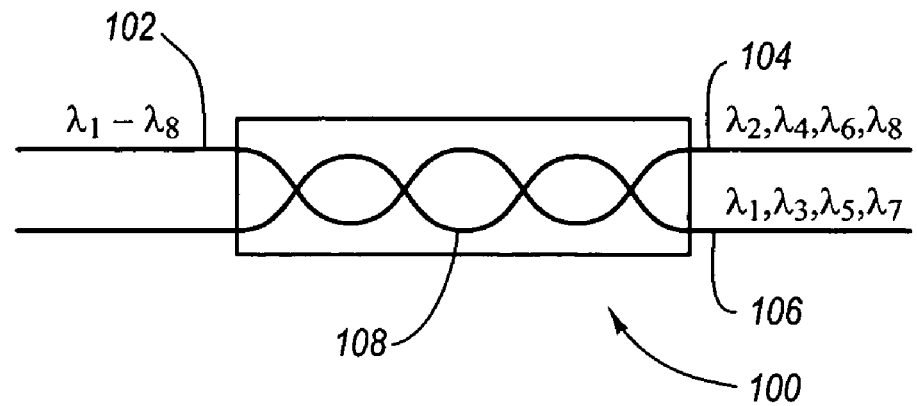
FIG. 1A illustrates an example of a fused-fiber interleaver.

An interleaver is one type of device that can be used to achieve add and/or drop functions of an optical add/drop module (OADM). By using several stages of interleavers, channels can be extracted from and/or added back into a WDM signal. One example of a fused-fiber interleaver is shown in FIG. 1A and is generally designated as 100. The fabrication of a fused-fiber interleaver involves twisting together a pair of optical fibers. The twisted optical fibers are heated at the point where they are twisted together, causing the fibers to fuse. While still in a heated condition, the fibers are pulled and stretched to obtain the desired optical characteristics. This fused-fiber technique can be used in the fabrication of the interleaver 100. Fused-fiber interleavers typically have a Gaussian frequency response.

The interleaver 100 includes an input fiber 102, and output fibers 104 and 106. In this example, a CWDM signal is input to the input fiber 102 and the CWDM signal includes eight channels or wavelengths: $\lambda_1$, $\lambda_2$, $\lambda_3$, $\lambda_4$, $\lambda_5$, $\lambda_6$, $\lambda_7$ and $\lambda_8$. Each $\lambda_n$ represents a particular carrier wavelength. Although eight channels are illustrated in this example, other systems and signals may use more or fewer channels. In this example, the channel designated as $\lambda_1$ may be the channel disposed on the 1470 nm wavelength, the channel designated as $\lambda_2$ is the channel spaced at the next adjacent 20 nm interval, or at 1490 nm, and so forth.

In FIG. 1A, the CWDM signal propagates to the fiber junction 108. Because of the way in which the fibers have been twisted, fused, and stretched, the channels are divided up into two groups of alternating signals by the interleaver 100. The group of channels generated on the output fiber 104 includes the channels $\lambda_2$, $\lambda_4$, $\lambda_6$, and $\lambda_8$. The second group of channels, $\lambda_1$, $\lambda_3$, $\lambda_5$, and $\lambda_7$, are carried by the output fiber 106. The output fibers 104 and 106 may be connected to subsequent optical devices that further interleave or deinterleave the channels carried by the output fibers 104 and 106.

The interleaver device 100 is reciprocal. This means that if light is input at the fiber 104 and the fiber 106, then the input fiber 102 will become an output fiber that carries a multiplexed or combined signal that carries the channels or wavelengths on the fibers 104 and 106.

Figure 1B:
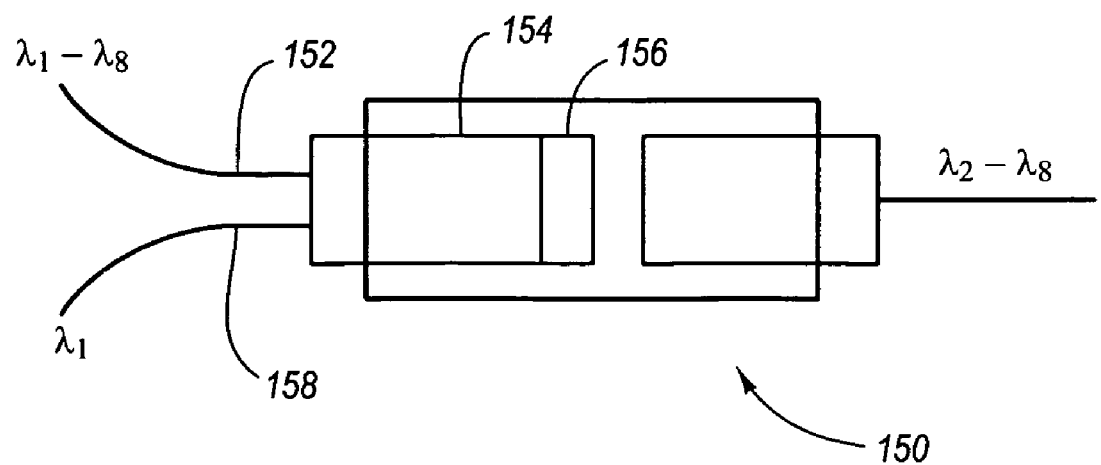
FIG. 1B illustrates an example of a thin film filter for dropping a particular channel.

Another component that is used in multiplexed signal applications is a three-port thin film device or a thin film filter such as the optical drop 150 shown in FIG. 1B. The optical drop 150 has an input fiber 152 coupled to a dual fiber collimator 154. The input fiber 152 accepts the multiplexed signal that includes, in this example, eight channels $\lambda_1$, $\lambda_2$, $\lambda_3$, $\lambda_4$, $\lambda_5$, $\lambda_6$, $\lambda_7$ and $\lambda_8$. A thin film 156 is formed on the dual fiber collimator 154. The thin film 156 is formed such that it reflects one of the channels or wavelengths on the multiplexed signal, for example $\lambda_1$, into a reflection fiber 158. The reflected channel can then be used by a network device having need of the particular channel.

Figure 2:
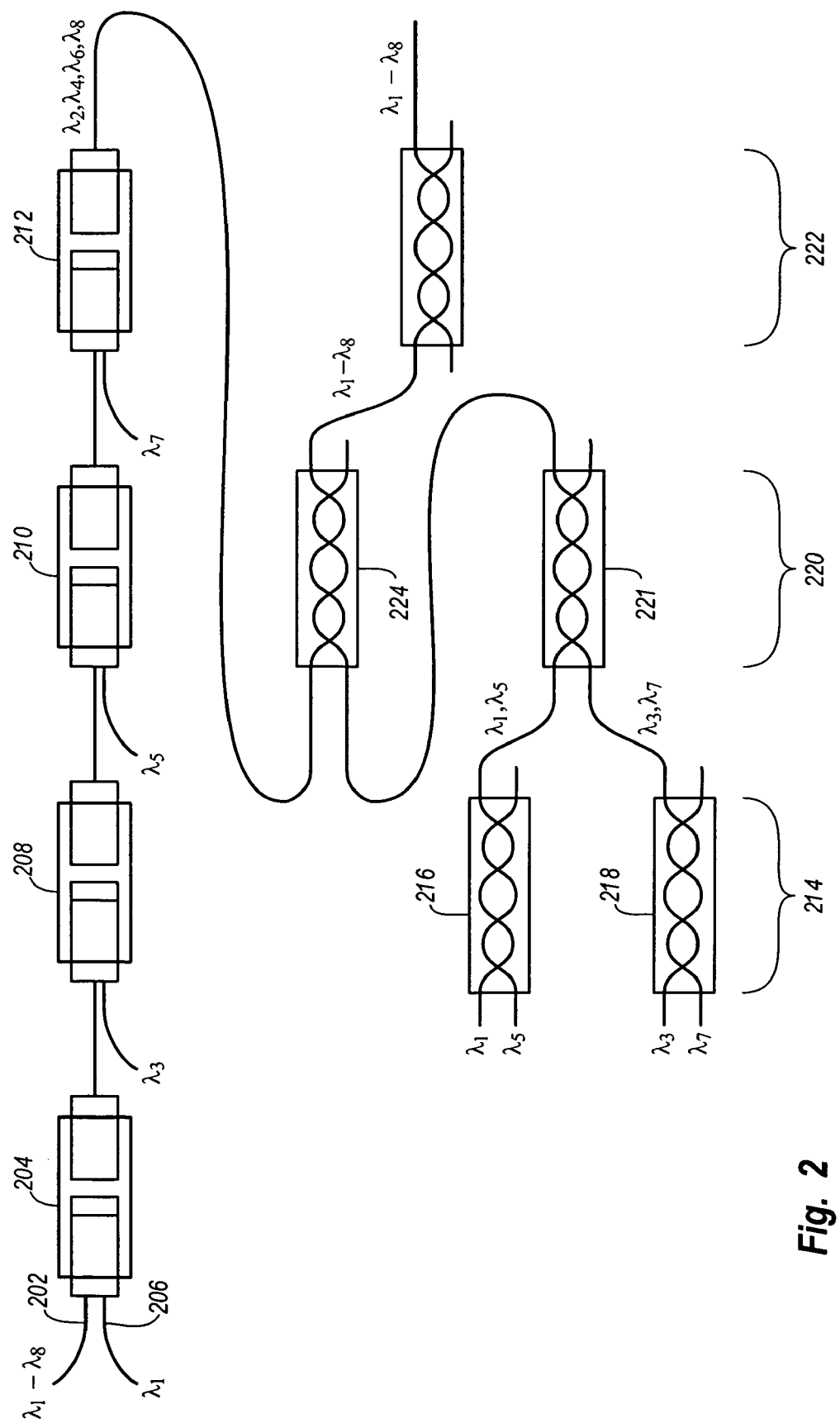
FIG. 2 illustrates an example of a four channel optical add/drop module.

In a typical application, a network device may have need of various channels disposed on the multiplexed signal. The needed channels will then be extracted from the multiplexed signal. One example of signal extraction is shown in FIG. 2. A multiplexed signal comprising the channels $\lambda_1$, $\lambda_2$, $\lambda_3$, $\lambda_4$, $\lambda_5$, $\lambda_6$, $\lambda_7$ and $\lambda_8$, is the input to an input fiber 202 of the first three-port device 204. The three-port device 204 is constructed as described above such that it reflects the channel $\lambda_1$ into the first channel path 206. The remainder of the multiplexed signal is fed into a second three-port device 208. The second three-port device 208 causes a second channel, for example $\lambda_3$, to be extracted for use by the network device having need of the channel. The remainder of the multiplexed signal is fed into another three-port device 210 where yet another channel, namely $\lambda_5$, is extracted. Finally a fourth channel, $\lambda_7$, is extracted by a fourth three-port device 212. The remaining channels, $\lambda_2$, $\lambda_4$, $\lambda_6$, and $\lambda_8$, are propagated further on in the network. In one embodiment the three-port devices 204, 208, 210, and 212 are thin film filters. In an alternate embodiment of the invention, the three port devices are such that single channels pass through the three port devices, where they are available for use by a network device having need of the channel, while the remainder of the multiplexed signal is reflected into another three port device.

To add the dropped channels back into the multiplexed signal for use by other components on the optical network, fused-fiber interleavers, as described above, may be used. For example in FIG. 2, three stages of fused-fiber interleavers are shown. The first stage 214 includes the interleavers 216 and 218. The interleavers 216 and 218 each interleave two channels that are 80 nm apart. The interleaver 216 combines the channels $\lambda_1$ and $\lambda_5$ while the interleaver 218 combines the channels $\lambda_3$ and $\lambda_7$. The second stage 220 is configured to interleave channels spaced 40 nm apart and includes interleavers 221 and 224. Thus the interleaver 221 combines the outputs of the first stage 214 into a single signal. As shown in FIG. 2, the interleaver 224 is connected in series with the interleaver 221 so as to receive the output of interleaver 221, namely, channels $\lambda_1$, $\lambda_3$, $\lambda_5$, and $\lambda_7$. The interleaver 224 then interleaves the channels received from interleaver 221 with the channels $\lambda_2$, $\lambda_4$, $\lambda_6$ and $\lambda_8$ received from three port device 212, so that the output of the second stage 220 is channels $\lambda_1$-$\lambda_8$. The third stage 222 is configured to interleave channels spaced 20 nm apart. By cascading these interleavers, the CWDM signal that includes the channels $\lambda_1$, $\lambda_2$, $\lambda_3$, $\lambda_4$, $\lambda_5$, $\lambda_6$, $\lambda_7$ and $\lambda_8$ can be reconstituted and sent further on in the network as shown in FIG. 2. Much of the time, thin film interleavers are used because of the Gaussian response of fused-fiber interleavers.

Another challenge in optical multiplexing arrangements is addressing the temperature sensitivities of the equipment used in such arrangements. For example the wavelength of the DFB laser(s) that are commonly used in a CWDM system changes according to the temperature at which it is operating, as well as with age and other factors. The change in wavelength may be as much as 15 pm/° C. This means that a particular channel may need a bandwidth in some applications that is +/−6 nm from the defined carrier channel wavelength. Thus, one characteristic of an exemplary add/drop module is that the flat-top frequency response is essentially constant over a bandwidth about a defined carrier channel wavelength, wherein the bandwidth is about ±6 nm. Further, the interleaver device itself has some temperature sensitivities. As described previously, the optical characteristics of the fused-fiber interleaver are obtained by stretching or pulling the optical fiber. Changes in temperature will cause the interleaver device to expand or contract thus changing the filtering characteristics of the device.

A Gaussian response combined with temperature sensitivities can often result in less than desirable channel separation, especially at the 20 nm interleave stage 222 where the channels are more densely packed. Signal crosstalk may become a problem. To improve the channel separation at the 20 nm stage 222, an additional fused-fiber device 224 may be placed in series with the 20 nm interleave stage 222. This improves the channel separation because the frequency response of the additional fused-fiber device 224 is combined with the frequency response of the 20 nm interleave stage 222 resulting in rapid drop off of a signal that approaches the bandwidth of an adjacent channel.

Figure 3:
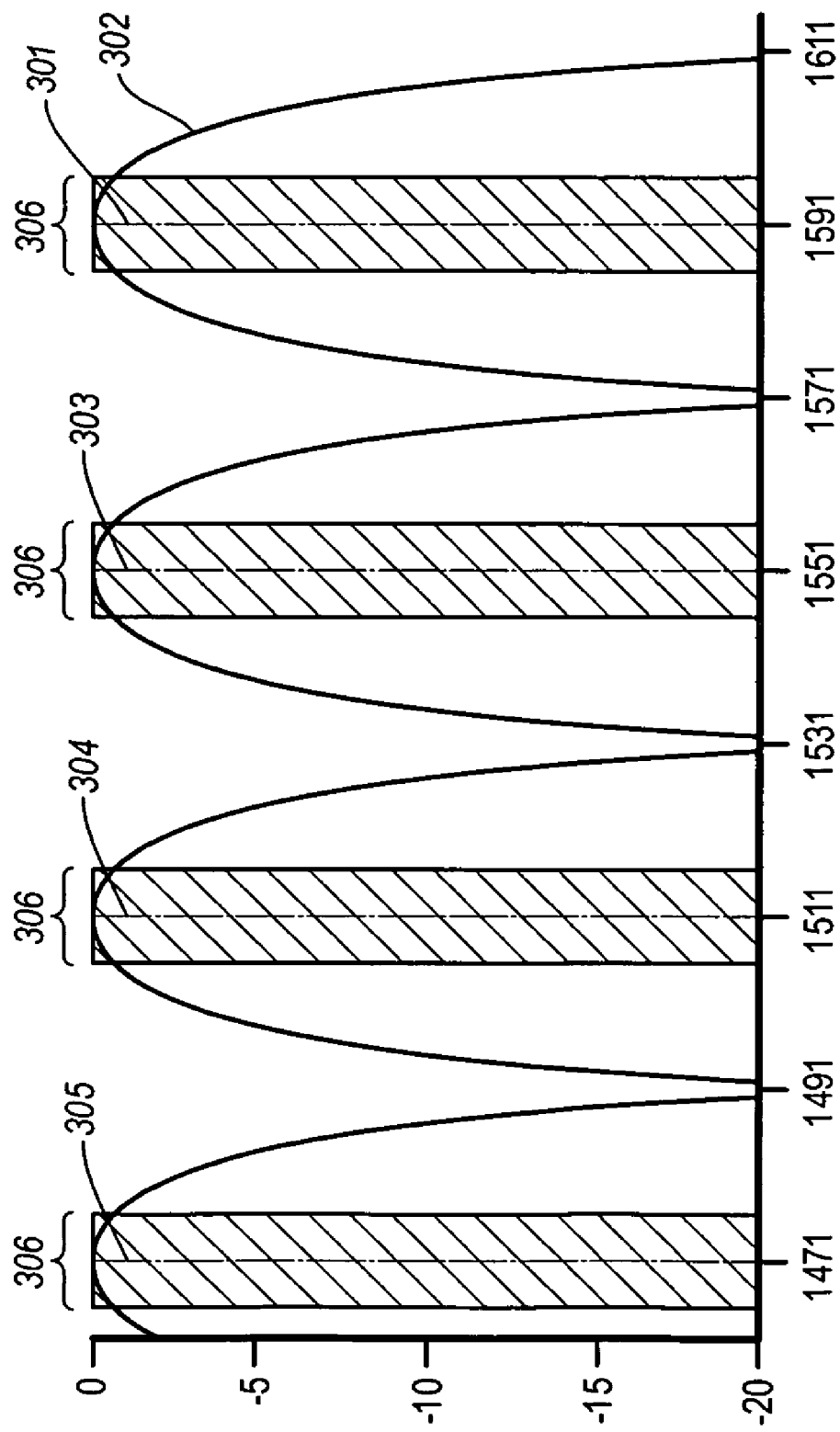
FIG. 3 is a graphical representation of the frequency response of a fused-fiber-optical add/drop module.

FIG. 3 is a graph illustrating the frequency response of the fused-fiber devices described above. FIG. 3 also shows a typical bandwidth of a carrier frequency superimposed on the frequency response of a fused fiber device. The frequency response of a typical fused-fiber three-port device is Gaussian. The carrier channels 301, 303, 304, and 305 are defined, in this example, by the system. The system performs best when the actual wavelengths of the carrier channels are close to the defined carrier channels 301, 303, 304, and 305. The Gaussian response 302 is low loss around the center carrier channel 301. As the channel wavelength drifts away from the preferred carrier frequency, response quickly drops off resulting in higher signal loss. For example, at the edge of the typical bandwidth 306, the Gaussian response 302 may cause significant signal loss as compared to the loss at the preferred carrier frequency 301. While generally small frequency shifts are tolerable so long as the wavelength output by the laser stays within a predefined bandwidth, heavy losses of the signal power are less tolerable as they can result in reduced distance that the network can be deployed in and higher error rates as the signal approaches an ambient noise level.

Additional problems of interleavers and of OADMs are insertion loss and cross talk. To control insertion loss in a fused-fiber interleaver device that exhibits a Gaussian top frequency response, one goal is to shape the frequency response such that the insertion losses are minimized as the actual frequency drifts from the defined channel frequency. This results in a wider frequency response. One drawback from having a wider frequency response is that adjacent channels become less isolated as the actual frequency varies from the defined channel frequency resulting in cross-talk. To reduce cross talk problems, the frequency response is shaped so that the losses are high as a particular frequency on a channel drifts towards other channels. Hence the need for some balance between controlling insertion loss and the need to reduce cross-talk.

The example shown in FIG. 3 illustrates a situation where the channels are sufficiently spaced so as to avoid some cross talk issues. Notably, the channels in FIG. 3 are spaced 40 nm apart. In a stage where channels are spaced, for example, 20 nm apart, cross talk issues should be more thoroughly addressed.

In one embodiment of the present invention, an add/drop module exhibits lower insertion loss across the channel bandwidth of a particular fiber optic channel while having improved isolation at a bandwidth edge. One embodiment uses a thin film interleaver at the final stages of the OADM, or where the channels are most densely packed. By combining the thin film interleaver at this stage with fused fiber interleavers at the less critical stages, the overall cost of the add/drop module is minimized while improving the performance of the OADM. This enables the use of coarse, fused fiber interleavers where the channel separation is larger, such as the 80 nm and 40 nm stages, while utilizing the thin film interleaver at the stage where the channels are most densely packed in, for example, a WDM signal.

Figure 4:
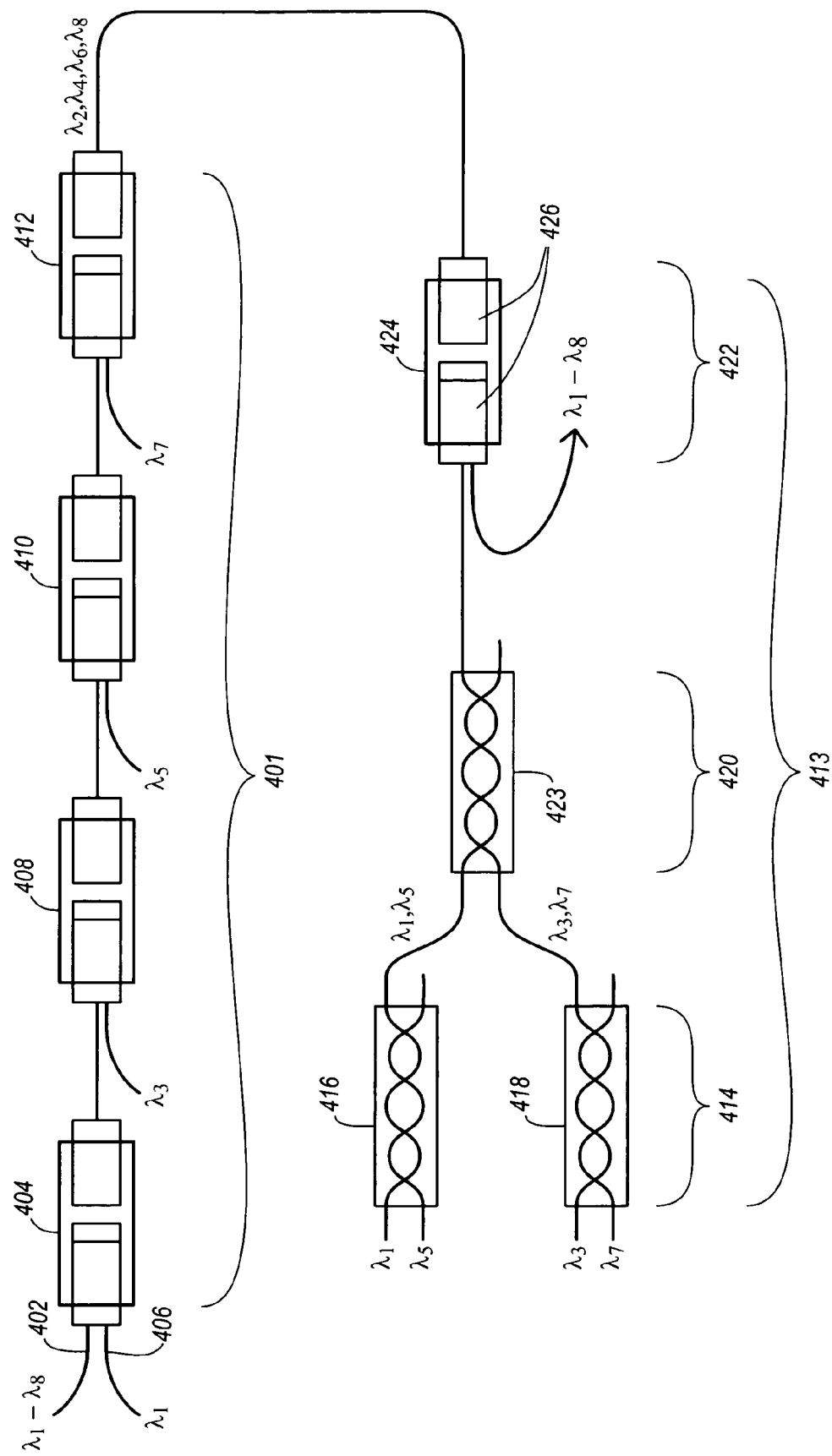
FIG. 4 illustrates one embodiment of an optical add/drop module using a thin film interleaver at a certain stage of the module.

FIG. 4 illustrates one embodiment of an optical add/drop module. The drop portion 401 of the OADM is first described. A CWDM signal including the channels $\lambda_1$, $\lambda_2$, $\lambda_3$, $\lambda_4$, $\lambda_5$, $\lambda_6$, $\lambda_7$ and $\lambda_8$, is the input to an input fiber 402 of a three-port device 404. The three-port device 404 is constructed such that it reflects or drops the channel $\lambda_1$ into the reflection fiber 406. The remainder of the CWDM signal is fed into a second three-port device 408. The second three-port device 408 causes a second cannel, for example $\lambda_3$, to be extracted for use by the network device having need of the channel and dropped from the CWDM signal. The remaining channels of the CWDM signal are fed into a third three-port device 410 where yet another channel, namely $\lambda_5$, is extracted or dropped from the CWDM signal. Finally a fourth channel, $\lambda_7$, is extracted or dropped by a fourth three-port device 412. The remaining channels of the CWDM signal, namely $\lambda_2$, $\lambda_4$, $\lambda_6$, and $\lambda_8$, are propagated further on in the network. Each of the three-port devices used to extract channels are thin film devices that in this embodiment are thin film filters. One advantage of using thin film devices is that channel isolation or separation can be maintained.

The add portion 413 of the OADM is now described. To add the dropped channels back into the multiplexed signal for use by other components on the network, fused-fiber interleavers as described above in FIG. 2 may be used for the less critical stages, i.e. the 80 nm stage 414 and 40 nm stage 420. Cross-talk is not as much of a problem at these stages because of the relatively wide channel separation.

In FIG. 4, two stages of fused-fiber interleavers are shown. The first stage 414 is set for 80 nm channel interleaving. Thus, each of the three port interleavers 416 and 418 that make up the first stage 414 interleave two channels that are 80 nm apart such as the channels $\lambda_1$ and $\lambda_5$ or $\lambda_3$ and $\lambda_7$. The second stage 420 in configured to interleave channels spaced 40 nm apart using a fused-fiber interleaver 423. A thin film interleaver 424 is used for the third stage 422 where the channels at the output of the thin film interleaver 424 are more densely packed and have a 20 nm channel separation in this example. The third stage 422 is configured to interleave channels spaced 20 nm apart. By cascading the devices of the first stage 414, the second stage 420 and the third stage 422, the CWDM signal including the channels $\lambda_1, \lambda_2, \lambda_3, \lambda_4, \lambda_5, \lambda_6, \lambda_7$ and $\lambda_8$ can be multiplexed together and sent further on in the network.

The thin film interleaver 424 replaces two of the fused-fiber interleavers present in another embodiment, namely the fused-fiber interleaver of the third stage 222 and the additional fused-fiber interleaver 224 shown in FIG. 2. The thin film interleaver 424 includes thin film(s) 426 that are configured such that the frequency response of the thin film interleaver 424 is a flattop response as opposed to the Gaussian response of a fused-fiber three-port device.

Figure 5:
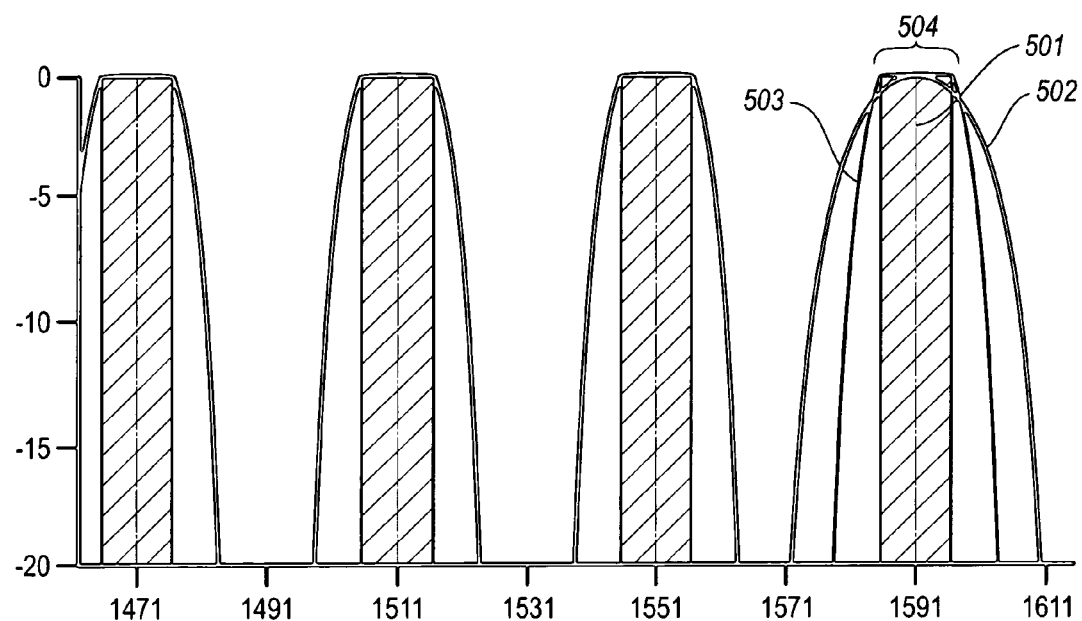
FIG. 5 is a graphical representation of the frequency response of the optical add/drop module shown in FIG. 4.

A typical flattop response of the thin film interleaver is shown in FIG. 5. As illustrated in FIG. 5, the thin film interleaver response 501 is more constant or flat in the region 504 around the defined carrier frequency 503. As the wavelength varies from the defined carrier wavelength, there is less loss associated with the flat-top response 501 than the Gaussian response 502.

Because of the flat-top frequency response across the channel, the frequency response of the thin film interleaver at the edges of the channel can be made to have very high losses. In this way, the isolation between adjacent channels remains very good resulting in less cross-talk between the channels.

Figure 6:
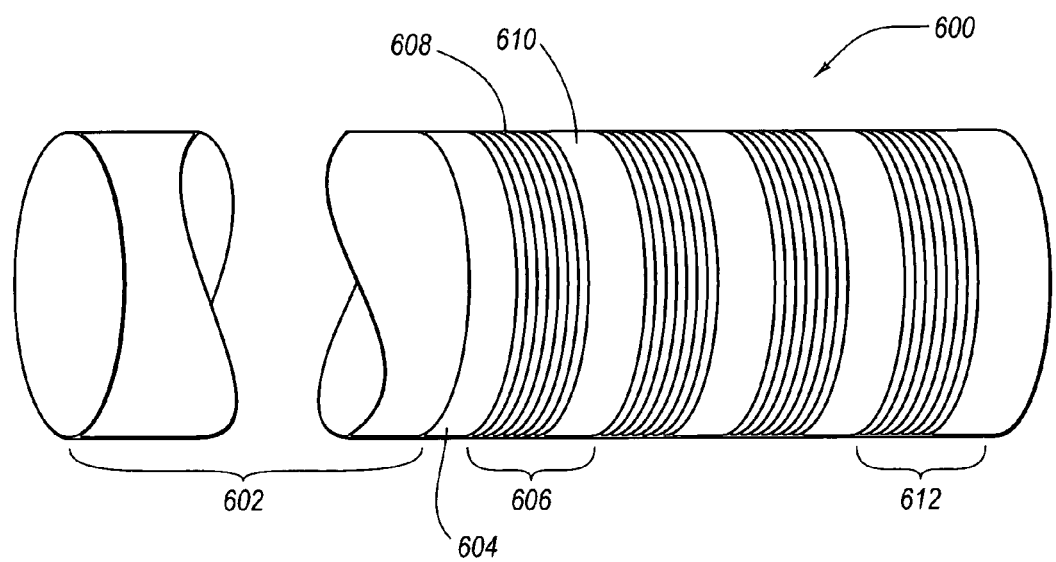
FIG. 6 illustrates an exemplary thin film interleaver.

FIG. 6 illustrates one example of the internal construction of a thin film interleaver that is shown and designated generally as 600. FIG. 6 is not drawn to scale as the concepts behind the construction of a thin film interleaver 600 can be better understood from this non-scale drawing. The thin film interleaver 600 is fabricated on an optical substrate 602. A first matching layer 604 is coupled to the optical substrate. The matching layer 604 has an index of refraction that provides for an efficient interface between the optical substrate 602 and the remaining thin film(s). An efficient interface for matching the optical substrate 602 and the remaining thin films may be designed such that:

$$n_{interface} = \sqrt{n_{substrate} * n_{film}}$$

where $n_{interface}$ is the index of refraction of the efficient interface, $n_{substrate}$ may be the index of refraction of the optical substrate 602 and $n_{film}$ may be the index of refraction of a thin film coupled to the efficient interface.

In one embodiment, four to six cavities are fabricated in the thin film interleaver 600. A cavity 606 typically includes multiple thin film layers 608 and a spacer 610. The spacer may be designed in one embodiment of the invention such that it conforms to:

$$FSR = \frac{c}{2nd}$$

where FSR is the free spectral range or channel spacing, c is the speed of light, n is the index of refraction of the spacer, and d is the spacer length.

The thin films and cavities of the interleaver 600 function on interference filters that consist of multiple alternating quarter-wavelength-thick layer of high refractive index and low refractive index. Light reflected within the layers of high index does not shift its phase, whereas light within low index shifts by 180°. Taking into account of travel difference in multiples of 2× quarter-wavelength-thickness, the successive reflections recombine constructively at the front face of the thin film optics, producing a highly reflected light beam for certain wavelengths. These reflected wavelengths, however, become destructed in the transmitted path. The thin films 608 are fabricated such that the desired interleaving function is accomplished. Generally, to achieve the interleaving function 72 to 74 thin film layers may be required. Because the interleaver is intended to be used with a multiplexed signal comprising various wavelengths, the wavelengths used to define the thin film thickness may be a median wavelength of the wavelengths intended for the particular interleaver device.

Figure 7:
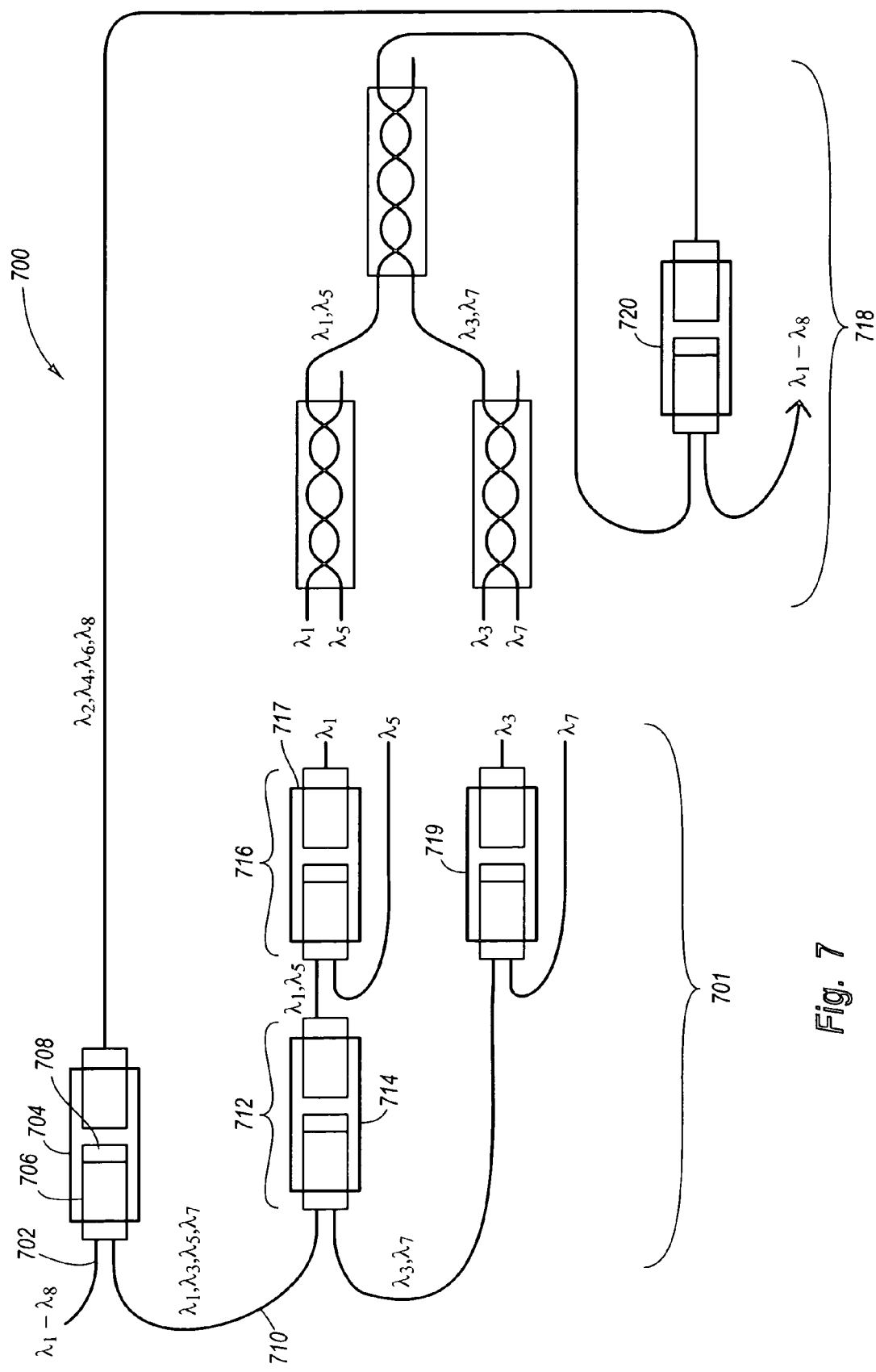
FIG. 7 illustrates another embodiment of an optical add/drop module using a thin film interleaver device at a stage of the optical add/drop module that interleaves the most densely packed channels and using thin film interleavers to drop channels from a wavelength division multiplexed signal.

Returning now to FIG. 6, several additional cavities similar to the first cavity 606 are serially applied to the optical substrate 602 in order to refine the frequency response to be as flat as possible. The final cavity 612 has a spacer that comprises a matching layer designed with an index of refraction intended to match the surrounding air and interleaver device 600. In one embodiment of the invention, the final cavity 612 has a spacer that conforms to:

$$n_{spacer} = \sqrt{n_{air} * n_{coll}}$$

where $n_{spacer}$ is the index of refraction of the spacer on the final cavity 612, $n_{air}$ is the index of refraction of the surrounding air, and $n_{coll}$ is the index of refraction of the interleaver device Referring now FIG. 7, another embodiment of the present invention is shown. FIG. 7 generally shows OADM module designated generally as 700. The OADM 700 differs from the OADM of FIG. 5 in that thin film interleavers are used to implement the drop portion 701 of the device 700. The device 700 comprises a network input port 702. The thin film device 704 includes a dual fiber pigtail 706. Disposed on the dual fiber pigtail 706 is a thin film 708.

The thin film 708 is fabricated such that a first group of channels is allowed to pass through lens while a second group of channels is reflected into a reflection path fiber 710 that is disposed on the dual fiber pigtail 706. The thin film 708 is designed to divide the wavelengths that comprise a multiplexed signal into two groups wherein each group comprises alternating channels. The first group of channels comprises channels generally designated in FIG. 7 as $\lambda 2, \lambda 4, \lambda 6$, and $\lambda 8$. The second group of channels is generally designated in FIG. 7 as $\lambda 1, \lambda 3, \lambda 5$, and $\lambda 7$. This particular thin film device 704 makes up a first stage that has 20 nm interleaving characteristics. In a second stage 712, a 40 nm thin film interleaver device 714 is used. In a third stage 716, 80 nm interleaver devices 717 and 719 are used. By using the three stages shown in FIG. 7, a demultiplexing function that separates out the needed channels in a multiplexed signal can be accomplished. The add portion 718 of the OADM 700 functions as described above for the OADM 400 in FIG. 4. The critical stage is a thin film interleaver 720.

Figure 8:
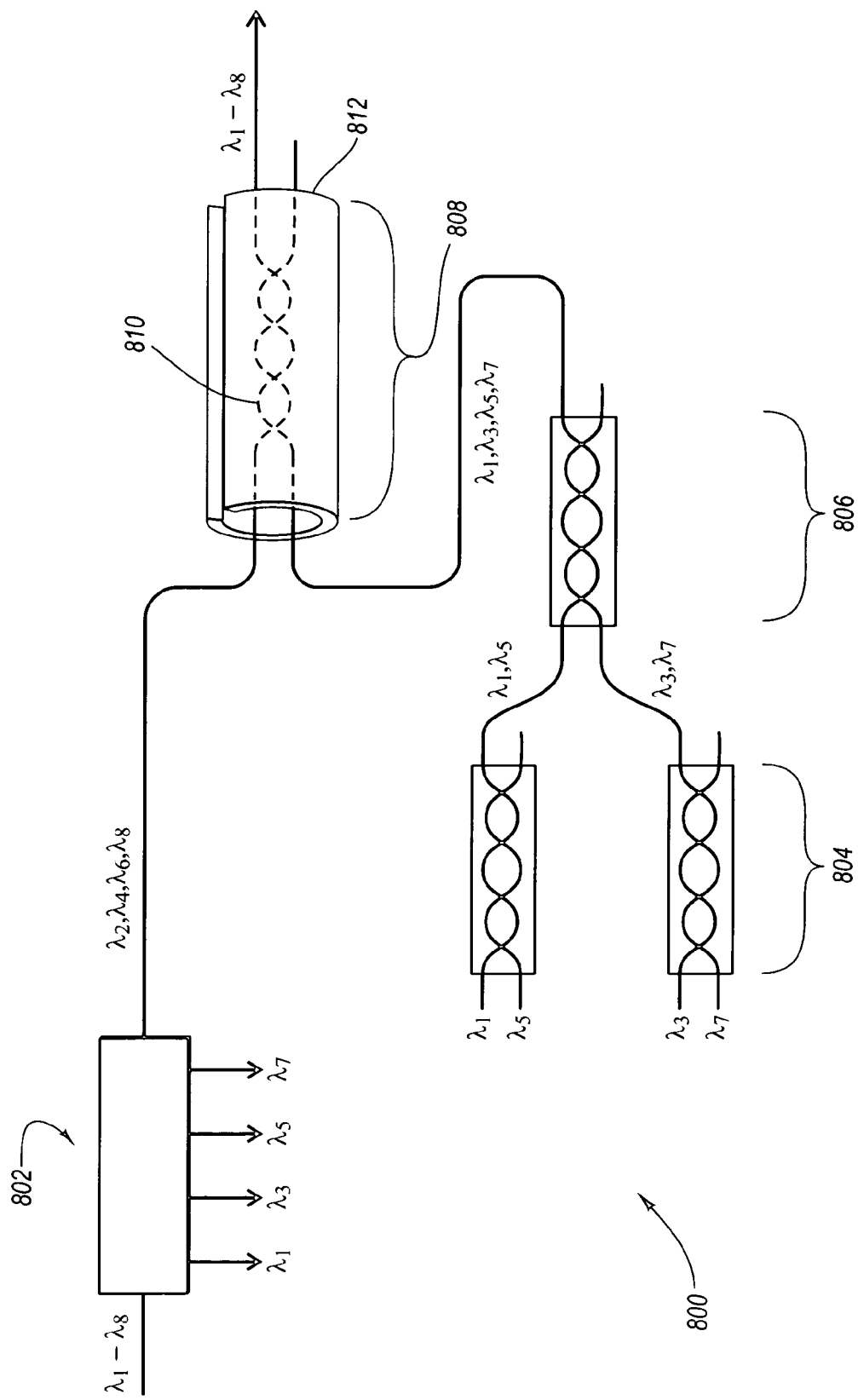
FIG. 8 illustrates an optical add/drop module using a ceramic sleeve to control the temperature sensitivities of a 20 nm interleaver stage.

In an alternate embodiment the temperature sensitivities of the multiplexing add portion can be controlled by encasing the critical 20 nm stage in a ceramic coupler as shown in FIG. 8. This implies that the critical stage is a fused-fiber interleaver, which is sensitive to temperature. The ceramic coupler has the property of contracting with temperature as the fused fiber expands. The harmful effects of the expansion are canceled by the ceramic coupler.

FIG. 8 illustrates an optical drop module designated as 800. The demultiplexing drop portion 802 of the OADM 800 functions by any of the methods previously set forth above. Further the 80 nm multiplexing stage 804 and 40 nm multiplexing stage 806 function as described above for the examples of FIGS. 4 and 6. The 20 nm stage 808 includes a fused-fiber device 810 constructed as described previously. To control the temperature sensitivities, the fused-fiber device 810 is disposed in and fastened to a ceramic coupler 812. The ceramic coupler has a thermal coefficient of expansion that is opposite in magnitude to the thermal coefficient of expansion of the fused-fiber device. In other words, any changes in the fused-fiber interleaver 810 because of temperature changes, will be offset by changes of the ceramic coupler 812. Notably, other fused fiber couplers that are less sensitive to temperature changes may also be used in place of the ceramic coupler 812.

The present invention can extend to 2 port OADMs, 4 port OADMs, 8 port OADMs, and so forth. Further, full duplex systems may require a pair of OADM modules to both transmit and receive multiplexed signals.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing a description. All changes which come within the meaning and range of equivalency of the claims are to be embraced within their scope.

What is claimed is:

1. An optical add/drop module for adding and dropping one or more channels from a wavelength division multiplexed (WDM) signal, the optical add/drop module comprising:
    a drop portion comprising a plurality of thin film filters, wherein each thin film filter drops a particular channel from a WDM signal;
    an add portion that adds channels of the WDM signal dropped by the drop portion back to the WDM signal, wherein the add portion comprises:
        a first stage of interleavers, wherein each interleaver in the first stage is a fused-fiber interleaver; and
        a final stage including a thin film interleaver, wherein the thin film interleaver has a flat-top frequency response.

2. The optical add/drop module of claim 1, wherein each thin film filter of the drop portion is configured to reflect a particular channel from the WDM signal while allowing other channels to pass through the thin film filter.

3. The optical add/drop module of claim 1, wherein each thin film filter of the drop portion is configured to allow a particular channel to pass through the thin film filter while reflecting other channels.

4. The optical add/drop module of claim 1, wherein at least one of the thin film filters of the drop portion is configured to deinterleave a multiplexed signal by allowing a first group of channels to pass through the thin film filter while reflecting a second group of channels.

5. The optical add/drop module of claim 4, wherein each group of channels comprises alternating channels.

6. The optical add/drop module of claim 1, wherein the flat-top frequency response is essentially constant over a bandwidth about a defined carrier channel wavelength.

7. The optical add/drop module of claim 1, wherein the final stage exhibits isolation of channels at a bandwidth edge.

8. The optical add/drop module of claim 1, the thin film interleaver comprising:
    a plurality of cavities, each cavity comprising one or more thin film layers and a spacer; and
    a final cavity comprising a spacer that comprises a matching layer designed with an index of refraction intended to match the thin film interleaver to surrounding air or to another device.

9. An optical add/drop module for adding and dropping one or more channels from a coarse wavelength division multiplexed (CWDM) signal, the optical add/drop module comprising:
    a drop portion configured to extract at least one optical channel from a multiplexed optical signal; and
    an optical add portion comprising:
        a plurality of interleavers disposed in stages, the stages in a cascade arrangement; and
        a final stage that interleaves the most densely packed channels, the final stage including a thin film interleaver with a flat-top frequency response.

10. The optical add/drop module of claim 9, wherein the drop portion comprises a plurality of thin film three-port devices.

11. The optical add/drop module of claim 10, wherein each thin film three-port device of the drop portion is configured to reflect a particular channel from the CWDM signal while allowing other channels to pass through the thin film three-port device.

12. The optical add/drop module of claim 10, wherein each thin film three-port device of the drop portion is configured to allow a particular channel to pass through the thin film three-port device while reflecting other channels.

13. The optical add/drop module of claim 10, wherein at least one of the thin film three-port devices of the drop portion is configured to deinterleave a multiplexed signal by allowing a first group of channels to pass through the thin film three-port device while reflecting a second group of channels.

14. The optical add/drop module of claim 13, wherein each group comprises alternating channels.

15. The optical add/drop module of claim 9, wherein the flat-top frequency response is essentially constant over a bandwidth about a defined carrier channel wavelength.

16. The optical add/drop module of claim 9, wherein the final stage exhibits isolation of channels at a bandwidth edge.

17. The optical add/drop module of claim 9, the thin film interleaver comprising:
    a plurality of cavities, each cavity comprising one or more thin film layers and a spacer; and
    a final cavity comprising a spacer that comprises a matching layer designed with an index of refraction intended to match the thin film interleaver to surrounding air or to another device.

* * * * *